Patented Mar. 25, 1952

2,590,760

UNITED STATES PATENT OFFICE 2,590,760

RESIN MADE FROM TANNIN, SULFURIC ACID, ACETONE, AND POTASSIUM CYANIDE

Vinicio Da Veiga, Sao Paulo, Brazil

No Drawing. Application April 27, 1948,
Serial No. 23,616

17 Claims. (Cl. 260—31.8)

This invention relates to plastic synthetic resins, and to the process of manufacture therefor.

It is an object of the invention to produce a synthetic resin which may be translucent, and which is capable of being moulded, for industrial purposes, in accordance with usual practice, or by special procedures and apparatus.

It is an object of the invention to produce a substantially translucent synthetic resin which may be processed into sheet form of any desired thickness. Such material may be either hard or flexible, and generally will, by reason of properties such as its lightness and translucency, be desirable as a substitute for glass.

It is an object of the invention to provide a process for the production of a synthetic resin of great strength, not brittle, and having a favorable reaction to high and low temperatures.

It is an object of the invention to provide a synthetic resin for the production of which simple apparatus and materials commonly available can be used.

It is an object of the invention to provide a synthetic resin, and the process for the manufacture of such a product, which, in the form of sheets, is capable of being cut or sawed in the cold state, or of being nailed, or in thin sheet form of being sewn, or of being bonded to materials such as iron, steel, silver, gold, and other metals.

The product of the process in accordance with the invention may be molded, at a temperature around 130° C., into various forms. In sheet form, it can be processed into articles of clothing and various other articles.

It is an object of the invention to provide a synthetic resin the process for the production of which involves very simple apparatus, and the production of which is effected in a period of time much shorter than that presently consumed for the preparation of other synthetic resins.

Other objects of this invention will be set forth hereinafter, or will be apparent from the description wherein certain embodiments for carrying out the invention are exemplified.

The invention, however, is not intended to be restricted to any particular composition, or any particular proportion, or any particular application of any such composition or proportion, or any particular process of preparation, or method of use, or any of various details thereof, even where specifically described herein, as the same may be modified in various particulars or may be applied in many varied relations without departing from the spirit and scope of the claimed invention, of which the exemplifying embodiments, herein described, are intended only to be illustrative, and only for the purpose of complying with the requirements of the statutes for disclosure of an operative embodiment, but not to demonstrate all the various modifications in which the invention might be embodied.

For carrying out the invention, the process may follow any one of a number of different procedures. In one case, the process so far as the production of the monomer, before polymerization, is concerned is carried out in a single vessel. At various stages, that vessel is sealed, and functions as a pressure chamber. At other times, it may function as a refluxing distillation apparatus. The vessel is suitably constructed to avoid corrosion, in view of the ingredients used. A lead lining has been found necessary for that purpose. The vessel is provided with means to effect agitation of the material being processed continuously therein. For instance, stirrers may be mounted with the cover of the vessel, and suitable motors may be provided to drive the stirrers. Shafts for the stirrers may extend through stuffing boxes in the cover of the vessel. Agitation is intended to occur continuously as the reaction mixture is heated.

For comparison purposes only, the process will be described as if it is being carried out in a vessel having a capacity of approximately one liter. Into this vessel are introduced the various ingredients, commencing with sulphuric acid and tannin. The best results have been obtained by providing the ingredients in the proportions to be indicated; but, of course, it is understood that these proportions may be varied, and still encompass the principles of the invention. For instance, sulphuric acid to the amount of 150 grams, of a concentration of 97½%, approximating 81.5 c. c., is delivered into the vessel. To this is added about 2 grams of tannin. Then the vessel is sealed off, agitation is commenced, and the contents heated to a temperature of 180° C. for one hour.

Now acetone, to the amount of 78 grams at a concentration of 96.5%, is delivered into the vessel, and potassium cyanide, to the amount of 42 grams, is added. The vessel is again sealed off, agitation is resumed, and the vessel again is heated, now to a temperature in the range between 160° C. and 170° C.

Preferably the vessel is constructed so that the progress of the reaction, as it proceeds, may be studied. For this purpose, a sight hole, or other means, may be provided. This portion of the reaction is exothermic, and also, after heating has proceeded, gases are given off, resulting in frothing or foaming When this stage is reached, a suitable discharge vent from the vessel to the atmosphere is opened, and the gases thus being formed released to the atmosphere.

After the reaction has subsided substantially, the vent to the atmosphere is closed, and heating is continued. Agitation has continued throughout this stage. The temperature to which the mixture is now heated is reduced to around 125° C., at which temperature the reaction is maintained for about 1½ to 2 hours. At the end of this period of about 2 hours, the vessel is cooled to room temperature. Cooling may be effected by permitting the vessel to stand, or it may be accelerated by circulating a cooling fluid through coils around the vessel.

After the vessel has been cooled, alcohol is delivered into the vessel. Methyl alcohol is preferred; about 56.05 grams of a concentration of 71.5% is added. At this time, the balance of tannin is restored by adding about 0.03 gram of tannin.

The vessel is sealed off again; agitation is resumed; esterification now takes place, as agitation is resumed, and the vessel is heated for about five hours. The temperature is maintained in a range approximately between 93° C. and 95° C.

After heating for about five hours in this manner, hydroquinone, to the amount of about 0.025 grams, is added to the product now in the vessel, in order to inhibit polymerization during the ensuing processing. The vessel is now connected so that a reflux condenser will return the vaporizable ingredients of the reaction, and the mixture in the vessel is heated and agitated. This refluxing is carried on at a temperature in the range between 85° C. and 140° C., and for about one hour.

After this refluxing stage has been completed, the product left in the vessel is a viscous, syrupy mass. Approximately the same quantity as before of hydroquinone, that is, 0.025 grams, is added to this reaction product, and about one gram of sodium carbonate is added together with the wash water, to neutralize any acid which may be present. The wash water is separated from the reaction product by any suitable method. It may be drawn off or siphoned off. Washing is repeated a number of times. Each washing may be effected with about 85 c. c. of water and 0.45 grams of sulphuric acid to bring the product to a neutral condition.

The reaction product should now be clear, and not clouded. If this washing does not produce the proper result, about 3 c. c. of ammonium sulphate is added in order to produce clarification.

Now to this reaction product, 1.85 cc. of commercial liquid phenol together with 0.25 grams of hydroquinone, is added. Agitation is commenced again, and again refluxing ensues, this time at a temperature in the range between 95° C. and 101° C. After the completion of this refluxing, the product should not be acid. If it is acid, washing is repeated until the product no longer is acid. The final reaction product at this stage is the monomer, which, in the further processing, is to be polymerized. This end product is to be utilized in the further steps of the different examples given.

*Example I.*—With the reaction product is mixed an amount of benzoyl peroxide of about 10% by weight of the reaction product. The mixture is agitated and heated between 93° C. and 95° C. for about one hour. After cooling, there results a crystalline mass which can be pulverized with or without the addition of a plasticizer. The pulverization may be done in a ball mill. The result is a molding material which may be molded in the usual manner, in molds at a temperature of around 130° C.

*Example II.*—With 10 parts of the reaction product, 2 parts of butyl phthalate, and benzoyl peroxide, to the amount of 1% by weight of the reaction product, are added. Polymerization takes place on standing, or in molds. If polymerization takes place merely by standing, the end product will be reached in around twelve hours. Where the mass of polymerized material is not molded as a part of the step of polymerization, it may be pulverized, and thereafter molded in the same manner as given in connection with Example I.

*Example III.*—To 10 parts of the powder resulting from either Example I or Example II, there is mixed 6 parts of benzoyl peroxide. To this product is added traces of beryllium oxide. This is heated in molds at 140° C. under pressure of about two tons per square foot. The product has the appearance of porcelain.

*Example IV.*—To 250 grams of the product in Examples I or II, 1500 grams of petroleum jelly or a good mineral oil is added. Then 10 grams of butyl phthalate from 0.04 gram of benzoyl peroxide are added to make the mixture. This mixture is then heated for 50 to 60 minutes in the temperature range between 93° C. and 95° C. The result is a syrup which is processed to eliminate the oil. This may be done by pressing the mass between rotating rolls. The polymerized material passes through, and the oil is squeezed out and runs off. The material is passed and repassed through the rolls a sufficient number of times to complete removal of the oil. The polymerized material is then washed with benzoyl. The product is put in a chamber and heated to 160° C. for six hours. The resultant product can be molded.

All of these products are clear and translucent. The product of Example IV is especially useful in molding teeth.

*Example V.*—To the powder produced by Example IV, there is added 1.25 parts of beryllium oxide or titanium oxide in relation to about 1000 parts of the powder. Pigments are added with 1% of benzoyl peroxide. This mass is pulverized again in a ball mill. The end product is useful for molding to make dentures and false teeth.

Many other changes could be effected in the particular composition, and in the proportions thereof, hereinbefore set forth, and in the method of preparation and use set forth, and in specific details thereof, without substantially departing from the invention defined in the claims, the specific description being merely of embodiments capable of illustrating certain principles of the invention.

What is claimed as new and useful is:

1. The steps of heating in a closed vessel with 78 parts by weight of acetone and 42 parts by weight of cyanide of potassium the product of digesting 2 parts of tannin by weight in 150 parts by weight of concentrated sulphuric acid, and then adding sufficient tannin to restore the tannin to the amount originally present.

2. The steps of agitating and heating to a temperature of about 170° C. and in a closed vessel with 78 parts by weight of acetone and 42 parts by weight of cyanide of potassium the product of digesting 2 parts by weight of tannin in 150 parts by weight of concentrated sulphuric acid, dissipating the evolved gases, and thereafter heating and agitating the reaction product at about 125° C. and under pressure, and then adding sufficient tannin to restore the tannin to the amount originally present.

3. The steps of heating with 78 parts by weight of acetone and 42 parts by weight of potassium cyanide for about two hours at about 170° C. The product of digesting 2 parts by weight of tannin and 150 parts by weight of sulphuric acid, cooling the product, and then adding sufficient tannin to restore the tannin to the amount originally present, and adding about 56 parts by weight of methyl alcohol, and then heating.

4. The steps of heating with 78 parts by weight of acetone and 42 parts by weight of potassium cyanide for about two hours at about 170° C. The product of digesting 2 parts by weight of tannin and 150 parts by weight of sulphuric acid, cooling the product, and then adding sufficient tannin to restore the tannin to the amount originally present, and adding about 56 parts by weight of methyl alcohol, then heating for about five hours at a temperature of about 95° C., and refluxing the product between the limits of 85° and 140° C. in the presence of traces of hydroquinone.

5. The steps of heating with 78 grams of acetone and 42 grams of potassium cyanide for about two hours at about 170° C. the product of digesting 2 grams of tannin and 150 grams of sulphuric acid, cooling the product, and then adding sufficient tannin to restore the tannin to the amount originally present, and adding about 56 grams of methyl alcohol, then heating for about five hours at a temperature of about 95° C., refluxing the product between the limits of 85° and 140° C. in the presence of traces of hydroquinone, washing the product to a substantially neutral condition, adding about 1.85 cubic centimeters of liquid phenol, and refluxing the product between 95° and 101° C.

6. The steps of polymerizing the monomer produced by the process of claim 5 by mixing the monomer with butyl phthalate and benzoyl peroxide, and pouring the mixture into molds.

7. The steps of polymerizing the monomer produced by the process of claim 5 by mixing the monomer with mineral oil, butyl phthalate and benzoyl peroxide, heating the mixture, and eliminating the oil from the mixture by squeezing the mixture.

8. The product produced by the process comprising the step of agitating and heating under pressure to a temperature of about 170° C. and without access of air the product of digesting 2 parts by weight of tannin in 150 parts by weight of concentrated sulphuric acid, and then adding 78 parts by weight of acetone and 42 parts by weight of cyanide of potassium.

9. The reaction product of a process which includes heating for about two hours at about 170° C. with 78 parts by weight of acetone and 42 parts by weight of potassium cyanide the product of digesting 2 parts by weight of tannin and 150 parts by weight of sulphuric acid, adding tannin and methyl alcohol, continuing heating, refluxing the product in the presence of traces of hydroquinone, washing the product to a substantially neutral condition, adding phenol, and heating.

10. The process of preparing a product for polymerization to produce a plastic resin, including the steps of agitating in a sealed container and at a temperature of about 180° C. for one hour sulphuric acid and tannin in a batch having approximately the proportions of 150 grams of 97½% sulphuric acid to two grams of tannin, adding acetone and potassium cyanide to the resultant product in the proportion of 78 grams of 96.5% acetone to 42 grams of potassium cyanide, then agitating and maintaining the temperature between 160° C. and 170° C., venting to the atmosphere evolved gases, agitating after subsidence of gas evolution and maintaining the temperature at about 125° C. for a period of about one and one-half hours to two hours, cooling the reaction product, agitating the product with methyl alcohol and tannin in the proportions of 56.05 grams of 71.5% methyl alcohol and 0.03 grams of tannin, and heating the mixture for about five hours between 93° C. and 95° C.; adding hydroquinone in the proportion of 0.025 grams to the stage product, and refluxing the resultant mixture while agitating it by heating it to a temperature between 85° C. and 140° C. for about one hour; adding hydroquinone in the proportion of 0.025 gram to the step product, washing, neutralizing and clarifying the step product; adding commercial liquid phenol and hydroquinone in the proportions of 1.85 c. c. of phenol and 0.25 grams of hydroquinone, refluxing while agitating and heating between the temperatures of 95° C. and 101° C., and washing to remove any acidity.

11. The process of preparing a plastic resin, including the steps of agitating in a sealed container and at a temperature of about 180° C. for one hour sulphuric acid and tannin in a batch having approximately the proportions of 150 grams of 97½% sulphuric acid to two grams of tannin, adding acetone and potassium cyanide to the resultant product in the proportion of 78 grams of 96.5% acetone to 42 grams of potassium cyanide, then agitating and maintaining the temperature between 160° C. and 170° C., venting to the atmosphere evolved gases, agitating after subsidence of gas evolution and maintaining the temperature at about 125° C. for a period of about one and one-half hours to two hours, cooling the reaction product, agitating the product with methyl alcohol and tannin in the proportions of 56.05 grams of 71.5% methyl alcohol and 0.03 gram of tannin, and heating the mixture for about five hours between 93° C. and 95° C.; adding hydroquinone in the proportion of 0.025 gram to the stage product, and refluxing the resultant mixture while agitating it by heating it to a temperature between 85° C. and 140° C. for about one hour; adding hydroquinone in the proportion of 0.025 gram to the step product, washing, neutralizing and clarifying the step product; adding commercial liquid phenol and hydroquinone in the proportions of 1.85 c. c. of phenol and 0.25 gram of hydroquinone, refluxing while agitating and heating between the temperatures of 95° C. and 101° C., washing to remove any acidity; mixing with the final reaction product benzoyl peroxide in the amount of 10% by weight of the final reaction product, and agitating the mixture and heating it between 93° C. and 95° C. for about one hour.

12. The process of preparing a plastic resin, including the steps of agitating in a sealed container and at a temperature of about 180° C. for one hour sulphuric acid and tannin in a batch having approximately the proportions of 150 grams of 97½% sulphuric acid to two grams of tannin, adding acetone and potassium cyanide to the resultant product in the proportion of 78 grams of 96.5% acetone to 42 grams of potassium cyanide, then agitating and maintaining the temperature between 160° C. and 170° C., venting to the atmosphere evolved gases, agitating after subsidence of gas evolution and maintaining the temperature at about 125° C. for a period of about one and one-half hours to two hours, cooling the reaction product, agitating the product with methyl alcohol and tannin in the proportions of 56.05 grams of 71.5% methyl alcohol and 0.03 gram of tannin, and heating the mixture for about five hours between 93° C. and 95° C.; adding hydroquinone in the proportion of 0.025 gram to the stage product, and refluxing the resultant mixture while agitating it by heating it to a temperature between 85° C. and 140° C. for about one hour; adding hydroquinone in the proportion of 0.025 gram to the step product, washing, neutralizing and clarifying the step product; adding commercial liquid phenol and hydroquinone in the proportions of 1.85 cc. of phenol and 0.25 gram of hydroquinone, refluxing while agitating and heating between the temperatures of 95° C. and 101° C., washing to remove any acidity; mixing the final reaction product with butyl phthalate and benzoyl peroxide in the proportions of ten parts of the reaction product, two parts of butyl phthalate and benzoyl peroxide in the amount of 1% by weight of the reaction product, and permitting the mixture to stand.

13. The process of preparing a plastic resin, including the steps of agitating in a sealed container and at a temperature of about 180° C. for one hour sulphuric acid and tannin in a batch having approximately the proportions of 150 grams of 97½% sulphuric acid to two grams of tannin, adding acetone and potassium cyanide to the resultant product in the proportion of 78 grams of 96.5% acetone to 42 grams of potassium cyanide, then agitating and maintaining the temperautre between 160° C. and 170° C., venting to the atmosphere evolved gases, agitating after subsidence of gas evolution and maintaining the temperature at about 125° C. for a period of about one and one-half hours to two hours, cooling the reaction product, agitating the product with methyl alcohol and tannin in the proportions of 56.05 grams of 71.5% methyl alcohol and 0.03 gram of tannin, and heating the mixture for about five hours between 93° C. and 95° C.; adding hydroquinone in the proportion of 0.025 grams to the stage product, and refluxing the resultant mixture while agitating it by heating it to a temperature between 85° C. and 140° C. for about one hour; adding hydroquinone in the proportion of 0.025 gram to the step product, washing, neutralizing and clarifying the step product; adding commercial liquid phenol and hydroquinone in the proportions of 1.85 cc. of phenol and 0.25 gram of hydroquinone, refluxing while agitating and heating between the temperatures of 95° C. and 101° C., washing to remove any acidity; mixing with the final reaction product benzoyl peroxide in the amount of 10% by weight of the final reaction product, agitating the mixture and heating it between 93° C. and 95° C. for about one hour; pulverizing the final step product, adding traces of beryllium oxide and benzoyl peroxide to the resultant powder in the proportions of six parts of benzoyl peroxide to ten parts of the powder, depositing the resultant mixture in molds, and heating the mixture in the molds at 140° C. and under pressure of about two tons per square foot.

14. The process of preparing a plastic resin, including the steps of agitating in a sealed container and at a temperature of about 180° C. for one hour sulphuric acid and tannin in a batch having approximately the proportions of 150 grams of 97½% sulphuric acid to two grams of tannin, adding acetone and potassium cyanide to the resultant product in the proportion of 78 grams of 96.5% acetone to 42 grams of potassium cyanide, then agitating and maintaining the temperature between 160° C. and 170° C., venting to the atmosphere evolved gases, agitating after subsidence of gas evolution and maintaining the temperature at about 125° C. for a period of about one and one-half hours to two hours, cooling the reaction product, agitating the product with methyl alcohol and tannin in the proportions of 56.05 grams of 71.5% methyl alcohol and 0.03 grams of tannin, and heating the mixture for about five hours between 93° C. and 95° C.; adding hydroquinone in the proportion of 0.025 grams to the stage product, and refluxing the resultant mixture while agitating it by heating it to a temperature between 85° C. and 140° C. for about one hour; adding hydroquinone in the proportion of 0.025 gram to the step product, washing, neutralizing and clarifying the step product; adding commercial liquid phenol and hydroquinone in the proportions of 1.85 cc. of phenol and 0.25 gram of hydroquinone, refluxing while agitating and heating between the temperatures of 95° C. and 101° C., washing to remove any acidity; mixing the final reaction product with butyl phthalate and benzoyl peroxide in the proportions of ten parts of the reaction product, two parts of butyl phthalate and benzoyl peroxide in the amount of 1% by weight of the reaction product, permitting the mixture to stand; pulverizing the final step product, adding traces of beryllium oxide and benzoyl peroxide to the resultant powder in the proportion of six parts of benzoyl peroxide to ten parts of the powder, depositing the resultant mixture in molds, and heating the resultant mixture in the molds at 140° C. and under pressure of about two tons per square foot.

15. The process of preparing a plastic resin, including the steps of agitating in a sealed container and at a temperature of about 180° C. for one hour sulphuric acid and tannin in a batch having approximately the proportions of 150 grams of 97½% sulphuric acid to two grams of tannin, adding acetone and potassium cyanide to the resultant product in the proportion of 78 grams of 96.5% acetone to 42 grams of potassium cyanide, then agitating and maintaining the temperature between 160° C. and 170° C., venting to the atmosphere evolved gases, agitating after subsidence of gas evolution and maintaining the temperature at about 125° C. for a period of about one and one-half hours to two hours, cooling the reaction product, agitating the product with methyl alcohol and tannin in the proportions of 56.05 grams of 71.5% methyl alcohol and 0.03 grams of tannin, and heating the mixture for about five hours between 93° C. and 95° C.; adding hydroquinone in the proportion of 0.025 grams to the stage product, and refluxing the resultant mixture while agitating it by heating it to a temperature between 85° C. and 140° C. for about one hour; adding hydroquinone in the proportion of 0.025 gram to the step product, washing, neutralizing and clarifying the step product; adding commercial liquid phenol and hydroquinone in the proportions of 1.85 c. c. of phenol and 0.25 grams of hydroquinone for each batch, refluxing while agitating and heating between the temperatures of 95° C. and 101° C., washing to remove any acidity; mixing with the final reaction product benzoyl peroxide in the amount of 10% by weight of the final reaction product, agitating the mixture and heating it between 93° C. and 95° C. for about one hour; mixing with the final reaction product a product selected from the group consisting of petroleum jelly and mineral oil in the proportions of 250 parts of product and 1500 parts of the petroleum product, adding butyl phthalate and benzoyl peroxide to the resultant mix in the proportions of 10 grams of butyl phthalate and 0.04 gram of benzoyl peroxide for each 250 grams of final reaction product, heating the mix for about 50 to 60 minutes between 93° C. and 95° C., expressing and washing the petroleum product from the heated mix, and heating the petroleum-expressed residue in a chamber for about six hours at 160° C.

16. The process of preparing a product for polymerization to produce a plastic resin, including the steps of agitating in a sealed container and at a temperature of about 180° C. for one hour sulphuric acid and tannin in a batch having approximately the proportions of 150 grams of concentrated sulphuric acid to about two grams of tannin, adding acetone and potassium cyanide to the resultant product in the proportions of about 78 grams of 96.5% acetone to about 42 grams of potassium cyanide, and then agitating and maintaining the temperature between 160° C. and 170° C.

17. The process of preparing a product for polymerization to produce a plastic resin, including the steps of agitating in a sealed container and at a temperature of about 180° C. for one hour sulphuric acid and tannin in a batch having approximately the proportions of 150 grams of concentrated sulphuric acid to about two grams of tannin, adding acetone and potassium cyanide to the resultant product in the proportions of about 78 grams of 96.5% acetone to about 42 grams of potassium cyanide, then agitating and maintaining the temperature between 160° C. and 170° C., venting to the atmosphere evolved gases, agitating after subsidence of gas evolution and maintaining the temperature at about 125° C. for a period of about one and one-half hours to two hours, cooling the reaction product, agitating the product with methyl alcohol and tannin in the proportions of 56.05 grams of 71.5% methyl alcohol and 0.03 grams of tannin, and heating the mixture for about five hours between 93° C. and 95° C.

VINICIO DA VEIGA.

REFERENCES CITED

The following references are of record in the file of this patent:

UNITED STATES PATENTS

| Number | Name | Date |
|---|---|---|
| 2,071,932 | Macht | Feb. 23, 1937 |